US012116946B2

(12) United States Patent
Brueckner et al.

(10) Patent No.: US 12,116,946 B2
(45) Date of Patent: Oct. 15, 2024

(54) METHOD AND EVALUATION UNIT FOR DETECTING A MALFUNCTION OF A FUEL SYSTEM OF AN INTERNAL-COMBUSTION ENGINE

(71) Applicant: Bayerische Motoren Werke Aktiengesellschaft, Munich (DE)

(72) Inventors: Jonas Brueckner, Munich (DE); Sebastian Grasreiner, Graefelfing (DE); Florian Hartl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/424,705

(22) PCT Filed: Jan. 22, 2020

(86) PCT No.: PCT/EP2020/051534
§ 371 (c)(1),
(2) Date: Jul. 21, 2021

(87) PCT Pub. No.: WO2020/152228
PCT Pub. Date: Jul. 30, 2020

(65) Prior Publication Data

US 2022/0082058 A1 Mar. 17, 2022

(30) Foreign Application Priority Data

Jan. 22, 2019 (DE) ..................... 10 2019 101 532.4

(51) Int. Cl.
*F02D 41/22* (2006.01)

(52) U.S. Cl.
CPC ........ *F02D 41/22* (2013.01); *F02D 2041/224* (2013.01); *F02D 2200/0602* (2013.01)

(58) Field of Classification Search
CPC ............... F02D 41/22; F02D 2041/224; F02D 2200/0602
See application file for complete search history.

(56) References Cited

U.S. PATENT DOCUMENTS 5,937,826 A 8/1999 Olson et al.
8,397,552 B2 3/2013 Jackson et al.
(Continued)

FOREIGN PATENT DOCUMENTS

DE 199 80 564 C2 5/2000
DE 103 42 268 B4 4/2004
(Continued)

OTHER PUBLICATIONS

PCT/EP2020/051534, International Search Report dated Apr. 20, 2020 (Two (2) pages).
(Continued)

*Primary Examiner* — Grant Moubry
*Assistant Examiner* — Ruben Picon-Feliciano
(74) *Attorney, Agent, or Firm* — Crowell & Moring LLP

(57) ABSTRACT

A device for a fuel system that makes a fuel available for an operation of an internal-combustion engine where the fuel system includes a fuel pump which conveys the fuel into a fuel accumulator and includes one or more injection nozzles which convey the fuel from the fuel accumulator to a working mixture of one or more cylinders of the internal-combustion engine includes an evaluation unit. The evaluation unit is configured to ascertain pressure data with respect to a physical pressure in the fuel accumulator during an operation of the fuel system at a sampling-time, ascertain a change in a reference pressure at the sampling-time with aid of a reference model of the fuel system, and detect a defect of the fuel system on a basis of the pressure data and on a basis of the change in the reference pressure.

10 Claims, 3 Drawing Sheets

(56) References Cited

U.S. PATENT DOCUMENTS

| | | | | |
|---|---|---|---|---|
| 8,439,017 | B2 | 5/2013 | Peters et al. | |
| 2001/0025626 | A1 | 10/2001 | Antonioli et al. | |
| 2010/0275679 | A1* | 11/2010 | Wang | F02D 41/222 123/456 |
| 2011/0048393 | A1 | 3/2011 | Akita et al. | |
| 2013/0275026 | A1* | 10/2013 | Methil-Sudhakaran | F02M 65/003 701/34.4 |

FOREIGN PATENT DOCUMENTS

| | | | |
|---|---|---|---|
| DE | 10 2010 018 449 | A1 | 12/2010 |
| DE | 10 2010 037 147 | A1 | 4/2011 |
| DE | 10 2010 040 880 | A1 | 4/2011 |
| DE | 10 2011 051 049 | A1 | 2/2012 |
| DE | 10 2011 115 630 | B4 | 4/2012 |
| DE | 10 2011 005 283 | A1 | 9/2012 |
| DE | 10 2015 206 740 | A1 | 10/2015 |
| DE | 10 2014 222 542 | A1 | 5/2016 |
| EP | 1 118 761 | A2 | 7/2001 |
| WO | WO 2005/010333 | A1 | 2/2005 |
| WO | WO 2008/145617 | A1 | 12/2008 |
| WO | WO 2009/143858 | A1 | 12/2009 |

OTHER PUBLICATIONS

German Search Report issued in German application No. 10 2019 101 532.4 dated Nov. 5, 2019, with Statement of Relevancy (Seven (7) pages).

Chinese Office Action issued in Chinese application No. 202080008417.6 dated Nov. 28, 2022, with English translation (Eighteen (18) pages).

* cited by examiner

METHOD AND EVALUATION UNIT FOR DETECTING A MALFUNCTION OF A FUEL SYSTEM OF AN INTERNAL-COMBUSTION ENGINE

BACKGROUND AND SUMMARY OF THE INVENTION

The invention relates to a fuel system for an internal-combustion engine. In particular, the invention relates to a method and a corresponding device—or, more precisely, an evaluation unit—for detecting a malfunction or defect of a fuel system.

A vehicle with an internal-combustion engine includes a fuel system for supplying the internal-combustion engine with fuel, in particular with gasoline or diesel. For the purpose of detecting and/or locating a malfunction of the fuel system of a vehicle, active interventions in the fuel system typically take place which, however, cannot usually be carried out while the vehicle is in practical operation.

The present document is concerned with the technical object of enabling an efficient and reliable detection and/or location of a malfunction of a fuel system during the practical operation of an internal-combustion engine.

The object is achieved by each of the independent claims. Advantageous embodiments are described in the dependent claims and elsewhere. Attention is drawn to the fact that additional features of a patent claim dependent on an independent patent claim without the features of the independent patent claim or only in combination with a subset of the features of the independent patent claim may constitute a separate invention that is independent of the combination of all the features of the independent patent claim and that can be made the subject-matter of an independent claim, of a divisional application or of a subsequent application. This applies equally to technical teachings described in the description, which may constitute an invention that is independent of the features of the independent patent claims.

According to one aspect, an evaluation unit or a device for a fuel system is described. The fuel system has been set up to make fuel (in particular, liquid fuel such as gasoline or diesel, for example) available for the operation of an internal-combustion engine. The fuel system includes a fuel pump which has been set up to convey fuel into a fuel accumulator. The fuel in the fuel accumulator can be made available at a relatively high physical pressure (for example, at a pressure of 100 bar or more, 200 bar or more, or 300 bar or more, or 1000 bar or more). In particular, in the case of an internal-combustion engine for diesel fuel a physical pressure of 1000 bar or more, or 3000 bar or more (for instance, 3500 bar) may be used. On the other hand, the fuel system can, where appropriate, be operated within the low-pressure (LP) range. In this case, the physical pressure in the fuel accumulator may lie between 1 bar and 10 bar. Moreover, the fuel system includes one or more injection nozzles which have been set up to convey fuel out of the fuel accumulator into one or more cylinders of the internal-combustion engine. In other words, the one or more injection nozzles may have been set up to convey fuel from the fuel accumulator to a working mixture (in particular, to a fuel/air mixture) of one or more cylinders of the internal-combustion engine. The fuel system for each cylinder of the internal-combustion engine may exhibit precisely one or at least one corresponding injection nozzle. For instance, the fuel system for a 4-, 6- or 8-cylinder internal-combustion engine may exhibit 4, 6 or 8 injection nozzles.

The fuel system may consequently exhibit one or more influx components (for example, one or more pumps and/or valves), via which fuel is supplied to the fuel accumulator. Moreover, the fuel system may exhibit one or more efflux components (in particular, one or more injection nozzles), via which fuel is withdrawn from the fuel accumulator. The (in particular, all the) inlets and outlets pertaining to the fuel volume of the fuel accumulator can be balanced and monitored by the described evaluation unit on the basis of the actuating data for actuating the individual components.

The injection nozzles can be opened or activated selectively as a function of the angle of the crankshaft of the internal-combustion engine, in order to convey fuel into the respective cylinder. Moreover, the fuel pump can be operated between the opening phases or activation phases of the individual injection nozzles, in order to refill the common fuel accumulator for the injection nozzles with fuel. In each instance an injection nozzle and the fuel pump can consequently be operated alternately, in order to withdraw fuel from the fuel accumulator and to convey fuel into the fuel accumulator alternately. In one cycle (for example, for one or more revolutions of the crankshaft), the N injection nozzles of the fuel system can each be activated once and the fuel pump can be activated N times, where, for example, N=2, 3, 4, 6, 8 or more. For instance, in the case of a 4-stroke internal-combustion engine, one cycle may comprise two revolutions of the crankshaft (and consequently a total angular range of 720°). One cycle may, in particular, comprise or correspond to one complete pass of induction, compression, expansion (power) and exhaust for all the cylinders of an internal-combustion engine.

The evaluation unit has been set up to ascertain pressure data in respect of the physical pressure in the fuel accumulator at a sampling-time or at a particular crankshaft angle during the operation of the fuel system. The pressure data can be acquired by means of a pressure sensor of the fuel accumulator. The pressure data can be ascertained repeatedly at a plurality of consecutive sampling-times or for a plurality of crankshaft angles. One cycle (for example, with one or more revolutions of the crankshaft) can be subdivided into 100 or more, 500 or more, or 1000 or more sampling-intervals or angular intervals. By virtue of the repeated acquisition and evaluation of pressure data, the fuel system can be monitored at the plurality of consecutive sampling-times or at the plurality of different crankshaft angles.

In addition, the evaluation unit may have been set up to ascertain a change in the actual pressure in the fuel accumulator at the sampling-time (or at the plurality of sampling-times) on the basis of the pressure data. The change in the actual pressure can be ascertained as the difference between the measured pressure at the current sampling-time and the measured pressure at a (directly) preceding sampling-time.

Furthermore, the evaluation unit has been set up to ascertain a change in the reference pressure and, where appropriate, to compare the change in the actual pressure with the change in the reference pressure. The change in the reference pressure may be ascertained on the basis of a reference model of the fuel system or may depend on a reference model of the fuel system. The reference model may depend on one or more properties (in particular, the flow volume) of the fuel pump, and/or on one or more properties (in particular, the flow volume) of the one or more injection nozzles. Moreover, the reference model may depend on compressibility properties of the fuel. In particular, the reference model may have been designed to indicate a change in the physical pressure in the fuel accumulator that is to be expected when the fuel system is behaving in accordance with the reference model. In other words, the reference model may have been designed to predict a change in the physical pressure in the fuel accumulator that is to be expected at the sampling-time.

Furthermore, the evaluation unit has been set up to detect a defect and/or malfunction of the fuel system on the basis of the pressure data and on the basis of the change (to be expected) in the reference pressure. Moreover, the physical pressure acquired at a (directly) preceding sampling-time can be taken into consideration in order to detect a defect and/or malfunction of the fuel system. In particular, the pressure that results from the change (to be expected) in the reference pressure for the sampling-time can be compared with the pressure indicated in the pressure data. On the basis of the comparison, a defect and/or malfunction of the fuel system can then be detected. In particular, on the basis of the comparison of the change in the actual pressure resulting from the pressure data with the calculated change in the reference pressure, a (faulty) operation, deviating from normal operation, of the fuel system or of a component (in particular, the fuel pump and/or an injection nozzle) of the fuel system can be detected in reliable and efficient manner.

The reference model for ascertaining the change in the reference pressure may comprise one or more model parameters. The one or more model parameters may depend on the rate of flow and/or the flow volume of fuel pertaining to the fuel pump and/or to the one or more injection nozzles. In particular, the one or more model parameters may include at least one model parameter that indicates the actual flow volume of fuel pertaining to the fuel pump at the sampling-time (that is to say, within the time-interval between two directly consecutive sampling-times). Alternatively or additionally, the one or more model parameters may include at least one model parameter that indicates the actual flow volume of fuel pertaining to a particular injection nozzle of the one or more injection nozzles at the sampling-time (that is to say, within the time-interval between two directly consecutive sampling-times).

The evaluation unit may have been set up to ascertain adapted parameter values for the one or more model parameters, in order to reduce the deviation of the change in the reference pressure ascertained by means of the reference model from the change in the actual pressure indicated by the pressure data, or, more precisely, in order to reduce the deviation of a reference pressure ascertained by means of the reference model from an actual pressure indicated by the pressure data.

In other words, on the basis of the measured pressure data and on the basis of the model-based change in the reference pressure, a deviation can be ascertained which can be reduced or minimized in order to ascertain adapted parameter values for the one or more model parameters. For example, an actual pressure and a reference pressure can be ascertained and subtracted from one another. In corresponding manner, a change in the actual pressure and the change in the reference pressure can be ascertained and subtracted from one another.

The adapted parameter values for the one or more model parameters can consequently be ascertained in such a manner that the deviation between the change in the reference pressure and the change in the actual pressure (or, more precisely, the deviation between the reference pressure and the actual pressure) is reduced, in particular minimized. As a consequence of this, the reference model with the adapted parameter values for the one or more model parameters is able to describe or model the actual behavior of the fuel system (in which connection the actual behavior of the fuel system when a defect or malfunction obtains may deviate from the desired behavior of the fuel system).

Moreover, the evaluation unit may have been set up to detect a defect or malfunction of the fuel system on the basis of the adapted parameter values for the one or more model parameters. By virtue of the ascertainment of adapted parameter values for the one or more model parameters, defects or malfunctions can be detected in particularly reliable manner.

The evaluation unit may have been set up to compare the adapted parameter values for the one or more model parameters with initial parameter values for the one or more model parameters. The reference model with the initial parameter values for the one or more model parameters is able to describe or model the desired behavior and/or a fault-free behavior of the fuel system. In particular, the initial parameter values for the one or more model parameters may have been calibrated and/or measured, or ascertained, in respect of a fault-free fuel system (for example, in the course of, or prior to, commissioning of the fuel system). A defect or malfunction of the fuel system can then be detected in particularly reliable manner on the basis of the comparison of the adapted parameter values with the initial parameter values.

In particular, the evaluation unit may have been set up to determine whether or not the adapted parameter values deviate from the initial parameter values by more than a minimum deviation. The minimum deviation may depend on the manufacturing tolerance of the fuel system. A defect or malfunction of the fuel system can be detected on the basis of the comparison when (where appropriate, only when) it has been determined that the adapted parameter values deviate from the initial parameter values by more than the minimum deviation. By virtue of the consideration of a minimum deviation, the robustness of the detection of faults can be further enhanced.

The evaluation unit may have been set up to analyze the adapted parameter values for the one or more model parameters with the aid of a pattern-recognition algorithm, in particular in order to ascertain a type of the defect of the fuel system from a plurality of different types of defect. The plurality of different types of defect may, for example, comprise a defect of the fuel pump and/or a defect of a particular injection nozzle of the one or more injection nozzles. Moreover, a type of defect may indicate whether the flow volume of the respective component (for example, the fuel pump or an injection nozzle) of the fuel system is too high or too low. Alternatively or additionally, the type of defect may indicate whether a systematic measurement error of the pressure sensor for acquiring the pressure data obtains. The pattern-recognition algorithm may have been learned in advance by means of a machine-learning process. The use of a pattern-recognition algorithm enables a particularly reliable detection of a faulty behavior of a fuel system.

The evaluation unit may have been set up to ascertain, at a sequence of times, a corresponding sequence of adapted parameter values for the one or more model parameters. In other words, an evolution of the adapted parameter values for the one or more model parameters can be ascertained as a function of time. On the basis of the temporal sequence of the adapted parameter values for the one or more model parameters, it can then be predicted whether and, where appropriate, at what time it is to be expected that the adapted parameter values will deviate from the initial parameter values by more than the minimum deviation. In other words, on the basis of the temporal sequence of the adapted parameter values for the one or more model parameters a future faulty behavior of the fuel system can be predicted (before such a faulty behavior appears).

According to a further aspect, a fuel system is described that includes the evaluation unit described in this document. The fuel system can be utilized in tandem with an internal-combustion engine (for example, an internal-combustion engine that is operated when stationary, or an internal-combustion engine of a vehicle (land vehicle, watercraft and/or aircraft)).

According to a further aspect, a powered (road) vehicle (in particular, a passenger car or a truck or a bus or a motorcycle) is described that includes the evaluation unit described in this document and the fuel system described in this document.

According to a further aspect, a method is described for monitoring a fuel system having a fuel accumulator. The method includes the ascertainment of pressure data in respect of a physical pressure in the fuel accumulator at a sampling-time during the operation of the fuel system. In addition, the method includes the ascertainment, on the basis of a reference model for modeling the physical pressure in the fuel accumulator, of a change in the reference pressure in the fuel accumulator at the sampling-time. Moreover, the method includes the detection of a defect of the fuel system on the basis of the pressure data and on the basis of the change in the reference pressure.

According to a further aspect, a software (SW) program is described. The SW program may have been set up to be executed in a processor (for example, in a control device of a vehicle) and thereby to execute the method described in this document.

According to a further aspect, a storage medium is described. The storage medium may include a SW program that has been set up to be executed in a processor and thereby to execute the method described in this document.

It is to be noted that the methods, devices and systems described in this document can be used both on their own and in combination with other methods, devices and systems described in this document. Moreover, any aspects of the methods, devices and systems described in this document can be combined with one another in diverse ways. In particular, the features of the claims can be combined with one another in diverse ways.

The invention will be described in more detail in the following with reference to embodiment examples.

DETAILED DESCRIPTION OF THE DRAWINGS

Figure 1:
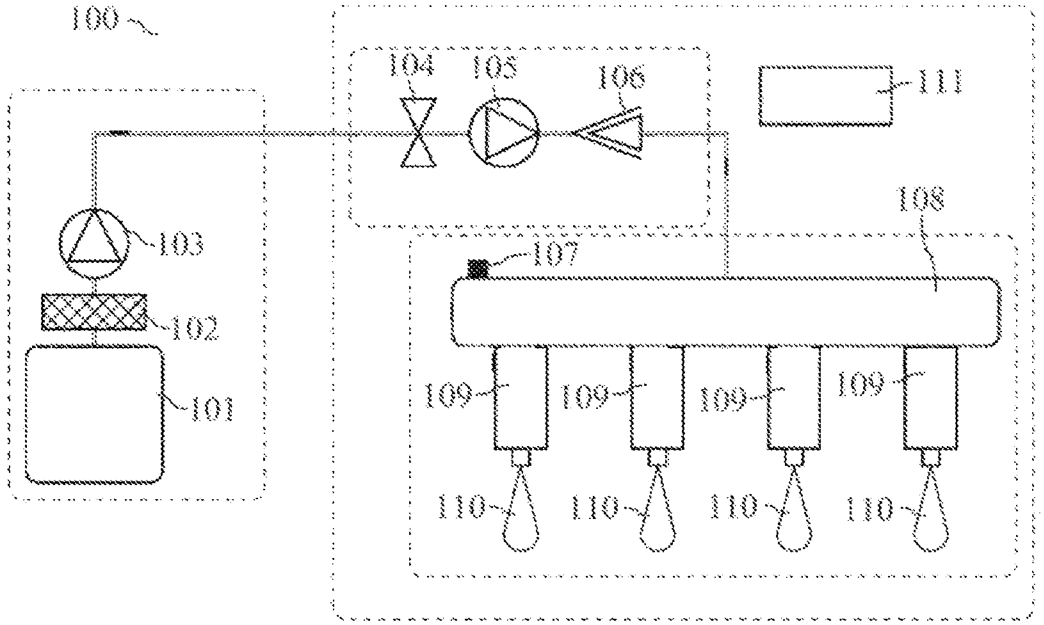
FIG. 1 illustrates an exemplary fuel system for an internal-combustion engine.

As stated at the beginning, the present document is concerned with the efficient and reliable detection of malfunctions in a fuel system during the practical operation of the fuel system. In this context, FIG. 1 shows an exemplary fuel system 100 with a low-pressure region and a high-pressure region. Attention is drawn to the fact that the aspects described in this document are also applicable to a fuel system 100 that exhibits only a low-pressure region, wherein fuel is injected directly from the low-pressure region into an internal-combustion engine.

The system 100 represented in FIG. 1 includes in the low-pressure region a fuel tank 101, from which, via a filter 102, fuel 110 is pumped into the high-pressure region by means of a pump 103. The high-pressure region includes a fuel pump 105, by which fuel 110 can be pumped repeatedly into a fuel accumulator 108. The high-pressure region can be decoupled from the low-pressure region via a valve 104. Moreover, a check valve 106 can prohibit the return flow of fuel 110 out of the fuel accumulator 108 in the direction of the fuel tank 101.

The fuel system 100 typically includes several injectors or injection nozzles 109 for several cylinders of an internal-combustion engine. The individual injection nozzles 109 have been set up to inject fuel 110 from the common fuel accumulator 108 into the respective cylinders. Moreover, the fuel system 100 typically includes a pressure sensor 107 which has been set up to acquire sensor data (also designated as pressure data in this document) in respect of the physical pressure in the fuel accumulator 108.

FIG. 1 consequently shows a direct-injection system 100 with a low-pressure (LP) fuel supply and a high-pressure (HP) injection system. Even relatively minor defects of the HP injection system may have relatively major effects on the performance, the emission behavior and/or the running properties of an internal-combustion engine, and hence on the handling of a vehicle. The components of the HP injection system exhibit, at least in some cases, a relatively high degree of integration with several functions, and also have relatively high costs of parts. Furthermore, the HP injection system typically exhibits only relatively few sensors, for example only a so-called rail-pressure sensor 107 for measuring the high pressure in the injection system. Further physical quantities of the HP injection system for controlling, regulating and/or diagnosing the HP injection system are mostly modeled or calculated. Comprehensive controller systems—such as, for example, the lambda control, the combustion control and/or the torque control of an internal-combustion engine—typically interact with the injection system.

The diagnosis of malfunctions of the HP injection system is typically relatively difficult, by reason of the relatively low number of sensor quantities and by reason of the interactions with other controller systems. In particular, the diagnosis usually requires active interventions in the HP injection system, which can only be carried out during the maintenance but not during the practical operation of a fuel system 100. As a result, the accuracy of the diagnosis is, in turn, impaired, since diagnoses usually can only be carried out in the idling mode of the internal-combustion engine. Moreover, a diagnosis during maintenance usually takes place only in reaction to an error message or in reaction to a complaint of a user of the fuel system 100, and consequently does not enable predictive maintenance. In addition, dedicated diagnoses during maintenance are usually associated with relatively high costs.

Figure 2A:
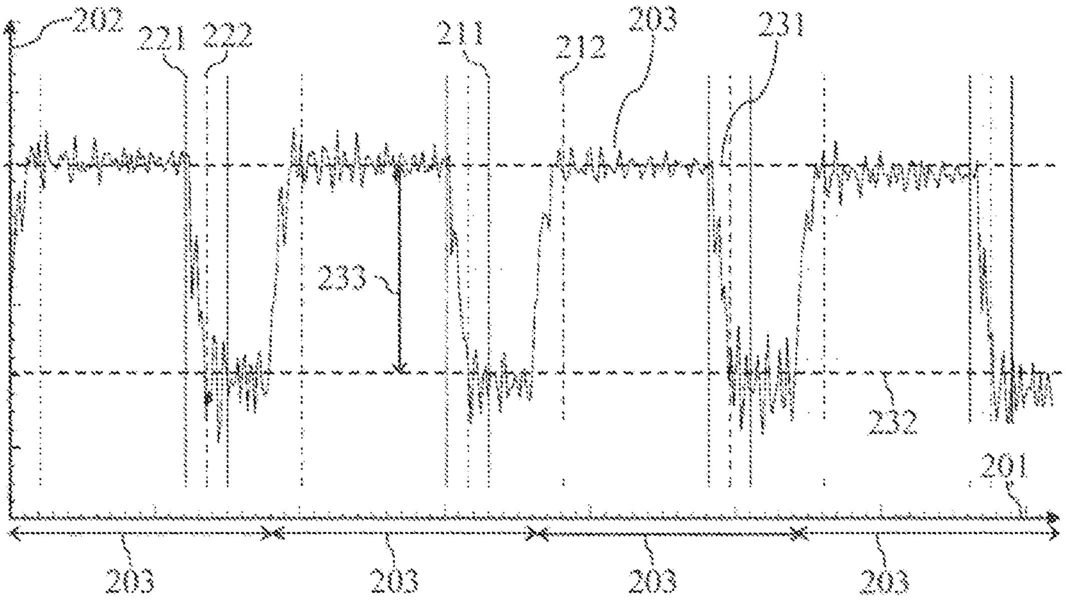
FIGS. 2*a* and 2*b* illustrate exemplary (temporal and/or angular) progressions of the physical pressure in the fuel accumulator of a fuel system.

FIG. 2*a* shows an exemplary progression 203 of the physical pressure 202 in the fuel accumulator 108 of a fuel system 100 as a function of the angle 201 of the crankshaft of an internal-combustion engine. In the example represented, the internal-combustion engine exhibits four cylinders which are supplied with fuel 110, in each instance within a dedicated angular range 203. The solid vertical line 221 within the angular range 203 of a cylinder indicates the angle 201 at which the injection nozzle 109 of the cylinder is activated or opened in order to inject fuel 110 from the fuel accumulator 108 into the cylinder. As a consequence of this, the pressure 202 in the fuel accumulator 108 falls. The dashed line 222 indicates the angle 201 at which the injection nozzle 109 of the cylinder is deactivated or closed again, so that thereupon the pressure 202 in the fuel accumulator 108 remains substantially constant at a reduced (second) level 232.

Moreover, FIG. 2*a* shows, within the angular range 203 of a cylinder, a further solid vertical line 211 at the angle 201 at which the fuel pump 105 is activated in order to pump new fuel 110 into the fuel accumulator 108. As a consequence of this, the physical pressure 202 in the fuel accumulator 108 rises again to an increased (first) level 231. The dashed line 212 indicates the angle 201 at which the fuel pump 105 is deactivated again.

Consequently, in each instance one of the N injection nozzles 109 and the fuel pump 105 of the fuel system 100 are operated alternately in one cycle, so that the pressure 202 falls or rises periodically. Attention is drawn to the fact that other sequences are also possible between the activation of the fuel pump 105 and the injector injections. In particular, the number of pump delivery strokes per revolution may be unequal to the number of injector injections per revolution. Where appropriate, the addition of fuel (by the pump 105) and the discharge of fuel (by at least one injector 109) can take place at the same time.

As can be gathered from FIG. 2*a*, in an example in which the fuel pump 105 and the individual injection nozzles 109 are operated alternately the pressure 202 in the fuel accumulator 108 in the case of a fault-free fuel system 100 oscillates between a relatively high first level 231 and a relatively low second level 232. The repeated operation of the fuel pump 105 leads to a defined rise in pressure by a positive differential amount 233. On the other hand, the operation of an injection nozzle 109 leads to a defined fall in pressure by a negative differential amount 233. In other words, in the course of repeated operation of the fuel pump 105 and of the injectors 109 within a steady-state load-point a rise and fall of the measured pressure 202, which is constant in each instance, is to be expected. The differential amount (that is to say, the change in pressure) 233 can be used for the purpose of detecting and/or locating a malfunction of the fuel system 100.

Figure 2B:
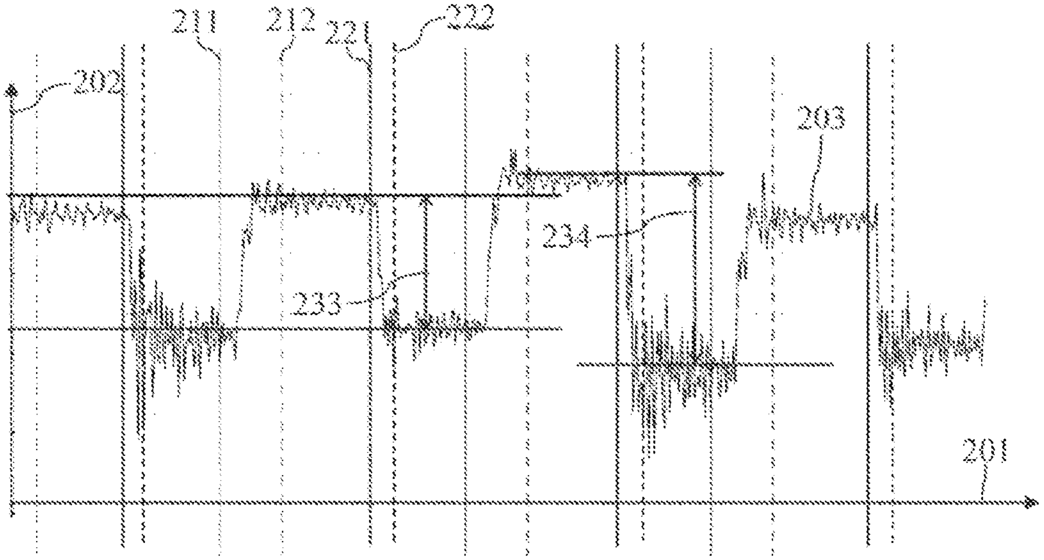

FIG. 2*b* shows an exemplary progression 203 of the physical pressure 202 in the fuel accumulator 108 for the case of a defective injection nozzle 109 which is exhibiting an excessively high rate of flow of fuel. From the pressure progression 203 it is evident that the fall in pressure for one injection nozzle 109 of the N injection nozzles 109 exhibits a relatively high differential amount 234 which exceeds the desired differential amount 233. From the excessive fall in pressure, a malfunction of the injection nozzle 109 within the angular range 203 within which the excessive fall in pressure has occurred can be inferred.

By virtue of the monitoring of the progression 203 of the physical pressure 202 in the fuel accumulator 108, a passive, watching diagnosis is consequently made possible which can be utilized in practical operation and which has no repercussions on the operation of the fuel system 100. In particular, the rise in pressure and/or the fall in pressure in the fuel accumulator 108 can be evaluated as a function of the current operating-point in the given case, or of the current crankshaft angle 201. By means of a reference model, a reference rise and/or a reference fall of the pressure 202 can be ascertained. The compressibility equation for the volume of delivered fuel to be expected can be taken into consideration. The reference rise and the reference fall can then be compared with the rise in pressure and fall in pressure, respectively, measured in the given case, in particular in order to detect a deviation between the actual pressure difference or change in the actual pressure 234 and the desired pressure difference or change in the desired pressure 233. In this way, a fault of the fuel system 100 can be detected and, where appropriate, located in reliable manner.

Figure 3:
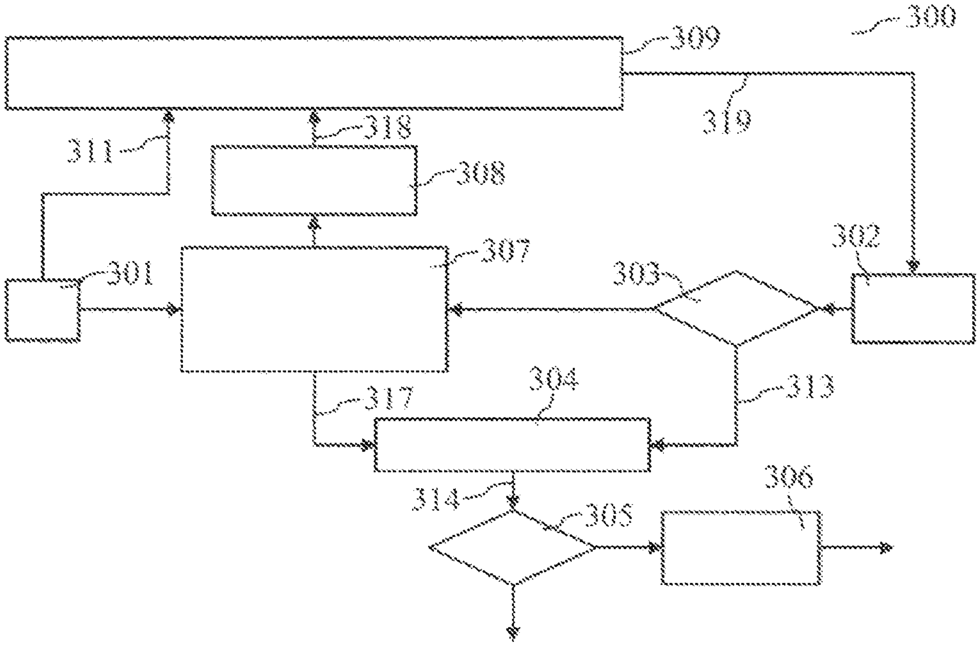
FIGS. 3 and 4 are flowcharts of exemplary methods for detecting a malfunction of a fuel system.

FIG. 3 shows a flowchart of an exemplary method 300 for detecting a malfunction of a fuel system 100. The method 300 can be executed by an evaluation unit 111 of the fuel system 100. At a particular sampling-time or at a particular crankshaft angle 201, a measurement of the pressure 202 by means of the pressure sensor 107 can take place (step 301), in order to make an actual pressure value $p_{rail_{ACT}}(\propto)$ 311 available (where a is the current crankshaft angle 201). Moreover, on the basis of a reference model a desired pressure value $p_{rail_{DES}}(\propto)$ 318 can be made available. From this, a differential value $\Delta p_{raul}(\propto)$ 319 can be calculated (step 309) as $p_{rail_{ACT}}(\propto)-p_{rail_{DES}}(\propto)=\Delta p_{rail}(\propto)$.

The reference model for ascertaining the desired pressure value 318 can be adapted, in order to reduce, in particular to minimize (step 302), the differential value 319. In particular, one or more parameters of the reference model can be adapted, in order to reduce or minimize the differential value 319. The adaptation of the reference model can take place iteratively, as represented in FIG. 3. With the aid of one or more characteristic curves for the fuel valve 104 or for the fuel pump 105, the volume of fuel 110 that is conveyed into the fuel accumulator 108 can be modeled. Moreover, with the aid of one or more characteristic curves for the one or more injection nozzles 109, the volume of fuel 110 that is withdrawn from the fuel accumulator 108 can be modeled. The change in volume dV of fuel 110 in the fuel accumulator 108 within a time-interval or angular interval can consequently be ascertained (step 307). The change in pressure dp brought about thereby can be ascertained by means of the compressibility equation $$dp = \frac{K}{V_{rail}} \cdot dV$$

(step 308), where $V_{rail}$ is the volume of the fuel accumulator 108, and where K is the bulk modulus of the fuel 110 (which can be assumed to be constant). From the change in pressure dp and the desired pressure value $p_{rail_{DES}}(\tilde{\propto})$ or the actual pressure value $p_{rail_{ACT}}(\tilde{\propto})$ at the preceding time or for the preceding angle value $\tilde{\propto}$, the current desired or reference pressure value $p_{rail_{DES}}(\propto)$ 318 can then be ascertained.

One or more model parameters of the reference model—in particular, one or more model parameters in respect of the one or more characteristic curves for ascertaining the flow volume of the fuel valve 104 and/or of the fuel pump 105, or of the injection nozzles 109—can be adapted, in order to reduce, in particular to minimize, the pressure difference 319. When a termination criterion is reached (step 303), a new or adapted set 313 of parameter values for the one or more model parameters can be made available. The new or adapted parameter set $PS_{final}$ 313 can be compared with an original or initial parameter set $PS_{ini}$ 317 (step 304), in order to calculate a parameter deviation ΔPS 314, in particular as $PS_{ini}-PS_{final}=\Delta PS$.

It can then be checked (step 305) whether or not the parameter deviation IPS 314 exceeds a particular deviation threshold value. In the case where the deviation threshold value is not exceeded, a fault-free fuel system 100 can be assumed. On the other hand, in the case where the deviation threshold value is exceeded, a fault can be assumed. Moreover, the new or adapted parameter set $PS_{final}$ 313 and/or the parameter deviation ΔPS 314 can be evaluated (step 306), for example by means of pattern recognition, in order to ascertain information in respect of a type of fault and/or in respect of a defective component (for example, the fuel valve 104, the fuel pump 105 and/or a particular injection nozzle 109).

Consequently an online optimization of reference-model parameters can take place, in order, starting from an initial parameter set 317, to reduce or minimize the deviation 319 between the actual pressure value 311 and the desired pressure value. The optimized or adjusted or adapted parameter values 313 can be compared with the initial parameter set 317 and used as error matrix for the detection of the deviation. In the case where a maximally permissible deviation is exceeded, the maximally permissible deviation taking, for example, tolerances of structural parts into consideration or being dependent on tolerances of structural parts, a diagnosis can take place with the aid of predefined error images (for example, by means of pattern recognition), in order to detect a fault of the fuel system 100.

Exemplary model parameters are:

- the volume ΔV of fuel 110 that flows through an injection nozzle 109 within a time-interval or within an angular interval; the volume may vary per time-interval or angular interval; and/or
- the volume ΔV of fuel 110 that is pumped through the fuel pump 105 within a time-interval or within an angular interval (for example, per angular range 203); the volume may vary per time-interval or angular interval; and/or
- an offset value Δp which has to be applied to a pressure progression ascertained by means of the reference model in order to assimilate the pressure progression ascertained with the aid of the reference model to the measured actual pressure progression 203. The offset value Δp is typically constant per time-interval. The offset value Δp can draw attention to a malfunction of the pressure sensor 107 (in particular, to a systematic fault of the pressure sensor 107).

Figure 4:
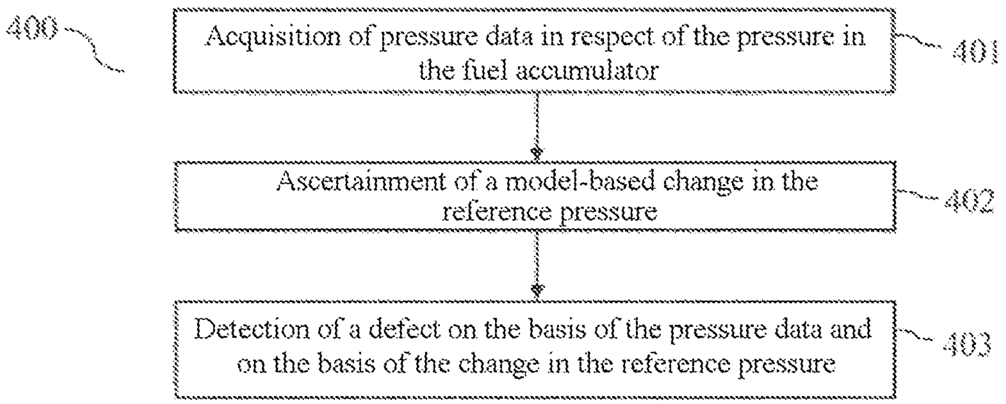

FIG. 4 shows a flowchart of an exemplary method 400 for monitoring a fuel system 100 for an internal-combustion engine. The method 400 can be executed by an evaluation unit 111 (in particular, by a control device) of the fuel system 100. The fuel system 100 includes a fuel pump 105 which has been set up to convey fuel 110 (in particular, a liquid fuel 110 such as gasoline or diesel, for example) into a fuel accumulator 108 (in particular, into a so-called common rail). In addition, the fuel system 100 includes one or more injection nozzles 109 which have been set up to convey fuel 110 out of the (common) fuel accumulator 108 into one or more cylinders of the internal-combustion engine. Typically, the fuel system 100 includes N=1, 2, 3, 4, 5, 6, 8, 10 or 12 injection nozzles 109 (for corresponding 1, 2, 3, 4, 5, 6, 8, 10 or 12 cylinders).

The method 400 includes the ascertainment 401 of pressure data in respect of a physical pressure 202 in the fuel accumulator 108 at a sampling-time during the operation of the fuel system 100. The pressure data can be acquired by means of a pressure sensor 107. The pressure data can be acquired at a plurality of consecutive sampling-times (or for a plurality of different crankshaft angles 201). In other words, the method 400 can be repeated at a plurality of consecutive sampling-times or crankshaft angles 201, in order to monitor the fuel system 100 virtually continuously. The entire angular range of the crankshaft can be subdivided into 100, 500, 1000 or more sampling-points or crankshaft angles 201.

The method 400 may further include the ascertainment of a change in the actual pressure in the fuel accumulator 108 at the sampling-time on the basis of the pressure data. The change in the actual pressure can be ascertained by comparison (in particular, by subtraction) of the pressure 202 at the current sampling-time with the pressure 202 at the preceding sampling-time.

In addition, the method 400 includes the ascertainment 402 of a change in the reference pressure 318 at the sampling-time or, more precisely, within the time-interval between the preceding sampling-time and the current sampling-time. The change in the reference pressure 318 can be ascertained by means of a reference model of the fuel system 100. Furthermore, within the scope of the method 400 the change in the actual pressure can be compared with the change in the reference pressure 318. A deviation 319 between the change in the actual pressure and the change in the reference pressure 318 can then be ascertained.

Moreover, the method 400 includes the detection 403 of a defect or malfunction of the fuel system 100 on the basis of the pressure data and on the basis of the change in the reference pressure 318. In particular, on the basis of the comparison or the deviation 319 between the change in the actual pressure and the change in the reference pressure 318 (or, more precisely, between the actual pressure 311 and the desired pressure or reference pressure), a defect or malfunction of the fuel system 100 can be detected.

By virtue of the measures described in this document, a robust diagnosis of the HP system and/or of the LP system of a fuel system 100 in practical operation is made possible. The described diagnostic model is based on the activation-times of components 105, 109 of the HP system or LP system (in particular, for the opening and closing of components 105, 109) and therefore exhibits no cross-action with further controllers. The described measures enable an identification and separation of error images of the individual components 105, 109 of the fuel system 100 on the basis of the progression 203 of the pressure 202 in the fuel accumulator 108 (the common rail). Moreover, a predictive detection of looming faults is made possible before a fault leads to an impairment of the operation of an internal-combustion engine. In addition, the described measures can be implemented in efficient manner as software (without the use of additional hardware).

For the predictive detection of a looming fault, the adapted parameter values for the one or more model parameters of the reference model of a fuel system 100 can be ascertained in the course of the running-time of the fuel system 100 (for example, as a function of the mileage of an internal-combustion engine of a vehicle). A development trend of the adapted parameter values for the one or more model parameters can then be extracted or predicted on the basis of the temporal development of the adapted parameter values for the one or more model parameters. In particular, it can be predicted whether and, where appropriate, when the adapted parameter values for the one or more model parameters will deviate from the initial parameter values by more than the minimum deviation. A looming fault of the fuel system 100 can consequently be predicted (before occurrence of the fault).

The present invention is not restricted to the embodiment examples shown. In particular, it is to be noted that the description and the Figures are intended to illustrate only the principle of the provided methods, devices and systems.

What is claimed is:

1. A system, comprising:

a fuel system that operates to make fuel available for operating an internal-combustion engine, the fuel system comprising:

a fuel accumulator, a fuel pump that conveys the fuel into the fuel accumulator, and one or more injection nozzles that convey the fuel from the fuel accumulator to a working mixture of one or more cylinders of the internal-combustion engine;

a pressure sensor configured to sense a physical pressure in the fuel accumulator; and an evaluation unit configured to:

ascertain pressure data with respect to the sensed physical pressure in the fuel accumulator at a sampling-time during the operation of the fuel system;

ascertain a change in a reference pressure in the fuel accumulator at the sampling-time from a directly preceding sampling-time, wherein the change in the reference pressure reflects an expected change in the sensed physical pressure in the fuel accumulator when the fuel system is behaving in accordance with a reference model of the fuel system; and detect a defect of the fuel system independent of the pressure sensor based on a comparison of: (a) the pressure data, and (b) the change in the reference pressure.

2. The system according to claim 1, wherein the reference model depends on one or more properties of the fuel pump and of the one or more injection nozzles.

3. The system according to claim 1, wherein:

the reference model comprises one or more model parameters; and the evaluation unit is configured to:

ascertain adapted parameter values for the one or more model parameters in order to reduce a deviation of a reference pressure ascertained by the change in the reference pressure from an actual pressure indicated by the pressure data; and detect a defect of the fuel system on a basis of the adapted parameter values.

4. The system according to claim 3, wherein the evaluation unit is configured to:

compare the adapted parameter values for the one or more model parameters with initial parameter values for the one or more model parameters; and detect a defect of the fuel system on a basis of a comparison of the adapted parameter values with the initial parameter values.

5. The system according to claim 4, wherein the reference model with the initial parameter values for the one or more model parameters describes a desired behavior and/or a fault-free behavior of the fuel system.

6. The system according to claim 4, wherein the evaluation unit is configured to:

determine whether or not the adapted parameter values deviate from the initial parameter values by more than a minimum deviation, wherein the minimum deviation depends on a manufacturing tolerance of the fuel system; and detect a defect of the fuel system if it has been determined that the adapted parameter values deviate from the initial parameter values by more than the minimum deviation.

7. The system according to claim 3, wherein:

the evaluation unit is configured to analyze the adapted parameter values for the one or more model parameters with aid of a pattern-recognition algorithm in order to ascertain a type of the defect of the fuel system from a plurality of different types of defect;

the plurality of different types of defect comprises a defect of the fuel pump and/or a defect of an injection nozzle of the one or more injection nozzles and/or a systematic measurement error of a pressure sensor for acquiring the pressure data; and the pattern-recognition algorithm was learned in advance by a machine-learning process.

8. The system according to claim 3, wherein:

the one or more model parameters depend on a rate of flow and/or a flow volume of the fuel pertaining to the fuel pump and/or to the one or more injection nozzles; and/or the one or more model parameters include at least one model parameter that indicates a flow volume of the fuel pertaining to the fuel pump at the sampling-time; and/or the one or more model parameters include at least one model parameter that indicates a flow volume of the fuel pertaining to an injection nozzle of the one or more injection nozzles at the sampling-time.

9. The system according to claim 1, wherein:

the evaluation unit is configured to ascertain the pressure data repeatedly at a plurality of consecutive sampling-times in order to monitor the fuel system at the plurality of consecutive sampling-times; and/or the plurality of consecutive sampling-times corresponds to a corresponding plurality of angles of a crankshaft of the internal-combustion engine.

10. A method for monitoring a fuel system that operates to make fuel available for operating an internal-combustion engine, wherein the fuel system comprises: a fuel accumulator, a fuel pump that conveys a fuel into the fuel accumulator, and one or more injection nozzles that convey the fuel out of the fuel accumulator into one or more cylinders of the internal-combustion engine, wherein the method comprises:

ascertaining, via a pressure sensor interacting with the fuel system, pressure data with respect to a physical pressure in the fuel accumulator at a sampling-time during an operation of the fuel system;

ascertaining a change in a reference pressure in the fuel accumulator at the sampling-time from a directly preceding sampling-time, wherein the change in the reference pressure reflects an expected change in the sensed physical pressure in the fuel accumulator when the fuel system is behaving in accordance with a reference model of the fuel system; and detecting a defect of the fuel system independent of the pressure sensor based on a comparison of: (a) the pressure data, and (b) the pressure data and the change in the reference pressure.

* * * * *